Sept. 17, 1968 J. R. KETO 3,401,710

PURE FLUID DEVICE FOR ISOLATING STEADY FLOW AND FOR CLIPPING TRANSIENT SIGNALS

Filed Feb. 25, 1965

INVENTOR,
JORMA R. KETO

BY: Harry M. Saragovitz, Edward J. Kelly, Herbert Berl & Charles L. Whitham

United States Patent Office 3,401,710
Patented Sept. 17, 1968

3,401,710
PURE FLUID DEVICE FOR ISOLATING STEADY FLOW AND FOR CLIPPING TRANSIENT SIGNALS

Jorma R. Keto, Rockville, Md., assignor to the United States of America as represented by the Secretary of the Army Filed Feb. 25, 1965, Ser. No. 435,390
10 Claims. (Cl. 137—81.5)

ABSTRACT OF THE DISCLOSURE

Fluid is passed through a transmission line having a means therein to create a low pressure region. Conduit means are in parallel with the means to create a low pressure region in the transmission line and receive the perturbations of flow in the transmission line.

The invention described herein may be manufactured and used by or for the Government of the United States of America for governmental purposes without the payment to me of any royalty thereon.

This invention relates generally to pure fluid devices, and more particularly to a pure fluid circuit for isolating steady flow and for clipping transient signals.

Pure fluid devices are a recent and valuable addition to the control and data processing arts. Such devices not only include the now well-known stream interaction or momentum exchange amplifiers and the boundary layer control amplifiers but also pure fluid oscillators, inertial sensing elements, and computer elements such as AND gates, NOR gates, and half-adders. These devices have already found applications in computing circuits, card and paper punches, heart pumps, and rocket vectoring control systems to name a few. The development of these devices and their acceptance for many diverse industrial applications have been swift for several reasons. Pure fluid devices are inexpensive and easily fabricated from many types of materials such as glass, plastics, and metals. This, of course, is always an advantage but particularly so in computer and complex control system applications requiring a large number of units. These devices are extremely rugged and compact which is most important in many industrial and military applications. Further, they are highly reliable and provide ready adaptation to many control applications often requiring no signal conversion. Pure fluid devices also have a very fast response time permitting them to be employed where only electronic circuits were adequate before their inception. In addition, pure fluid devices are totally unaffected in radiation enriched environments where electronic circuits and many mechanical systems would fail to operate.

Perhaps the most promising area of application for pure fluid devices is in the field of automatic control. As is well known by those skilled in the art, there often arises the need for some means that will effectively isolate a steady-state or D.C. bias signal from a transient or modulated A.C. signal. At the same time, it is usually necessary to clip the isolated transient signals or demodulate the A.C. signal to provide a useful control signal. Obviously, there are many other applications for such circuits and devices, many of which have had their origin in such diverse fields as the communication arts. In the past, it has been common to perform these functions in control systems with electronic circuits which lack the many advantages offered by the recently developed pure fluid devices. The development of more sophisticated and effective pure control systems depends upon the development of compatible fluid flow isolators and demodulators. Such devices would also have application to provide D.C. isolation between stages and isolation from negative signals in interconnections of pure fluid amplifiers. Isolation of this type has in the past been accomplished by means of bleeds and flow dividers. This has not been entirely satisfactory because of certain complications affecting the fabrication and operation of the pure fluid amplifiers.

It is therefore an object of the present invention to provide a pure fluid device for isolating steady fluid flow from transient fluid signals.

It is another object of this invention to provide means for isolating transient or modulated A.C. fluid signals from a steady fluid flow and for clipping or demodulating the isolated fluid signal.

It is a further object of the invention to provide a pure fluid transient signal isolator and clipper which produces an output signal that may be referenced to a different pressure from that to which the input signal or flow is referenced.

According to the present invention, the foregoing and other objects are attained by providing a first section for placement in a fluid transmission line which creates an area of low pressure. This area of low pressure is connected to a second section which comprises a duct or convergent nozzle which directs perturbation energy in the first section into the mouth of a receiving aperture. A chamber region may surround the area between the nozzle and the aperture.

The specific nature of the invention, as well as other objects, aspects, uses and advantages thereof, will clearly appear from the following description and from the accompanying drawing, in which.

Figure 1:
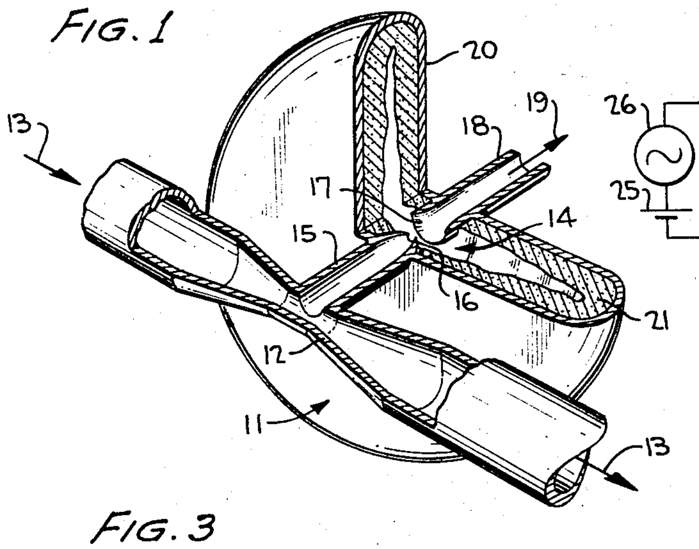
FIGURE 1 shows a partially cut-away perspective view of one embodiment of the invention.

Referring now to the drawings and more particularly to FIGURE 1 wherein the isolator is shown as a first section 11 for placement in a fluid transmission line. Section 11 comprises a venturi 12 through which a fluid flow, represented by arrows 13, passes. The venturi 12 is designed so that the decrease in static pressure at the throat with flow is such as to make the throat pressure equal to the pressure of the input of a fluid element which is to receive a signal from the isolator. This area of low pressure is connected to the second section 14 of the device by means of a tap, chamber or duct 15. The tap 15 is so constructed as to permit the low pressure area to be maintained at an appropriate pressure relative to the pressure within the tap. Thus, the steady flow within the tap 15 may be made to be zero, directed away from, or into the steady flow passing through the venturi 12 as desired. When the fluid flow 13 is steady, no fluid signal is communicated to the second section 14 through tap 15; however, when a wave front or pressure pulse travels down the main flow channel, a pressure perturbation is communicated through tap 15 to section 14. This is due to the disruption of the steady-state flow conditions in the low pressure area of venturi 12 by the wave front.

Figure 3:
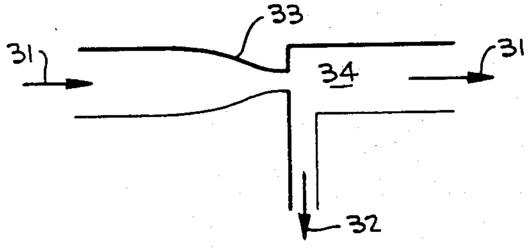
FIGURE 3 is a diagrammatic illustration of an alternative form the first section of the structure shown in FIGURE 1 may take.
Figure 4:
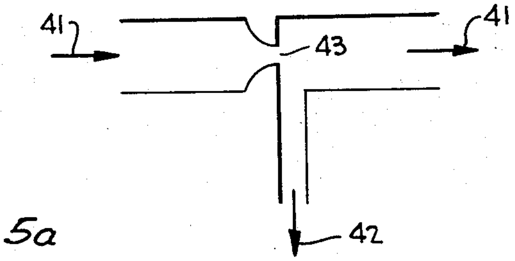
FIGURE 4 is a diagrammatic illustration of another form the first section of the structure shown in FIGURE 1 may taken; and FIGURES *5a* and *5b* are graphical representations of input and output fluid signals illustrating the performance of the structure shown in FIGURE 1.
Figure 5A:
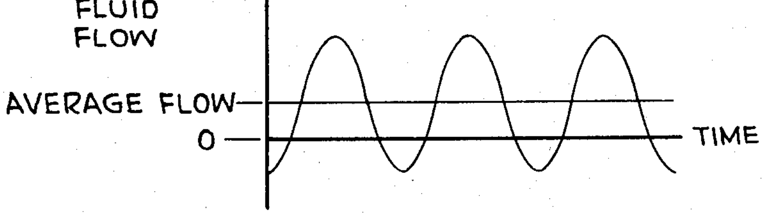
Figure 5B:
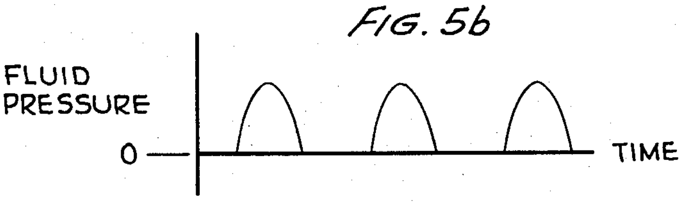

The first section 11 can assume a variety of shapes. As shown in FIGURE 3 where fluid flow is represented by the arrows 31 and the output pressure signal is represented by the arrow 32, the first section could comprise a convergent nozzle 33 followed by a setback region 34. Alternatively, as shown in FIGURE 4 where arrows 41 represent fluid flow and arrow 42 represents the output pressure signal, the first section may be formed by an orifice 43. Obviously, the first section may also comprise a convergent nozzle followed by a divergent nozzle or diffuser or a bellmouth entry followed by a diffuser, it being only necessary to create an area of low pressure to permit flow separation to take place.

Referring again to FIGURE 1 of the drawings, the second section 14 comprises a duct or convergent nozzle 16 attached to the tap 15 of the first section 11. Spaced apart from nozzle 16 and axially aligned therewith is a receiving aperture 17. Receiving aperture 17 is attached to a duct 18 which communicates fluid pressure signals represented by the arrow 19 to a fluid element (not shown). The nozzle 16 directs energy of pressure perturbations from the tap 15 of section 11 into the mouth of receiving aperture 17. The appropriate shaping and separation of the convergent nozzle 16 and receiving aperture 17 permits a positive pressure signal entering the convergent nozzle to span the separation, whereas a pressure rarefaction suffers attenuation since its energy requirements are satisfied mainly by the separation area between nozzle 16 and aperture 17. A closed envelope 20 containing acoustical absorbing material 21 surrounds the separation area between nozzle 16 and aperture 17. This permits pure fluid devices connected to duct 18 to operate at a different reference pressure to that to which the fluid flow 13 is referenced. The output of the device may be said to be "floating" with respect to the input. If both input and output signals are referenced to atmospheric pressure, envelope 20 may be omitted.

Figure 2:
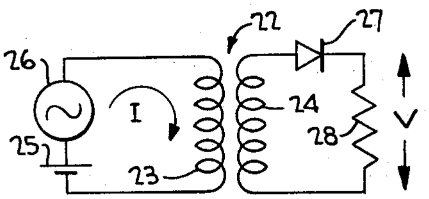
FIGURE 2 is an electrical schematic diagram useful in explaining the functions of the structure shown in FIGURE 1.

FIGURE 2 shows an electrical circuit analog of the structure shown in FIGURE 1. The circuit comprises an isolation transformer 22 having a primary winding 23 and a secondary winding 24. A source of direct current or battery 25 and A.C. current source 26 are connected in series with primary winding 23. A diode 27 and a load 28 are connected in series with secondary winding 24. The current I flowing in the primary winding is the sum of the current produced by the source of D.C. current 25 and A.C. current source 26. The current I is analogous to the fluid flow 13 in FIGURE 1. By the well-known laws of electromagnetic induction, only the varying part of the current I induces a current in the secondary winding 24. Thus, the transformer 22 provides isolation from the steady part of the current I and is, therefore, analogous to the first section 11 of the device shown in FIGURE 1. The current induced in the secondary winding 24 is clipped by diode 27 so that the voltage drop *v* across the load 28 is always positive. The diode 27 is then analogous to the nozzle 16 and aperture 17 shown in FIGURE 1. The voltage drop *v* is analogous to the pressure signal 19 appearing at duct 18. Since there is no common connection between the primary and secondary circuits of transformer 22, the voltages in the secondary circuit may be referenced to a different potential than that to which voltages are referenced in the primary circuit. Thus, the voltage *v* is "floating" with respect to the reference potential in the primary circuit much the same as the output pressure signal 19 is "floating" in FIGURE 1.

FIGURES *5a* and *5b* illustrate the operation of the device on a hypothetical signal. In FIGURE *5a* there is illustrated a varying fluid flow superimposed on a steady or average flow. FIGURE *5b* illustrates varying pressure signal which has been isolated from the steady flow and clipped.

It will be apparent that the embodiment shown is only exemplary and that various modifications can be made in construction and arrangement within the scope of the invention as defined in the appended claims.

I claim as my invention:

1. A pure fluid device for isolating steady flow comprising:
   (a) signal separation means for placement in a fluid transmission line for creating an area of low pressure; and
   (b) communication means connected at one end to said signal separation means for communicating a pressure perturbation caused by a wave front in a fluid flow in said signal separation means to a pressure signal utilization device, said communication means providing no pressure signal to a pressure signal utilization device in the absence of a wave front in a fluid flow in said signal separation means, whereby the steady fluid flow in said signal separation means is effectively isolated from a pressure signal utilization device; and
   (c) said pressure signal utilization device including a nonsymmetrical means connected at the other end of said communication means for passing pressure signals of one sense while substantially attenuating pressure signals of the opposite sense.

2. A pure fluid device for isolating steady flow as recited in claim 1 wherein said signal separation means comprises a venturi.

3. A pure fluid device for isolating steady flow as recited in claim 1 wherein said signal separation means comprises:
   (a) a convergent nozzle; and
   (b) a set back chamber connected to said convergent nozzle and positioned to receive a fluid jet emitted from said convergent nozzle.

4. A pure fluid device for isolating steady flow as recited in claim 1 wherein said signal separation means comprises an orifice.

5. A pure fluid device for isolating steady flow as recited in claim 1 wherein said signal separation means comprises:
   (a) a convergent nozzle; and
   (b) a divergent nozzle connected to said convergent nozzle and positioned to receive a fluid jet emitted from said convergent nozzle.

6. A pure fluid device for isolating steady flow as recited in claim 1 wherein said signal separation means comprises:
   (a) a convergent nozzle; and
   (b) a diffuser connected to said convergent nozzle and positioned to receive a fluid jet emitted from said convergent nozzle.

7. A pure fluid device for isolating steady flow as recited in claim 1 wherein said signal separation means comprises:
   (a) a bellmouth entry; and
   (b) a diffuser connected to said bellmouth entry and positioned to receive a fluid jet emitted from said bellmouth entry.

8. A pure fluid device for isolating steady flow and for clipping transient signals as recited in claim 1 wherein said nonsymmetrical means comprises:
   (a) a convergent nozzle; and
   (b) a receiving aperture in spaced apart relation to said convergent nozzle and axially aligned therewith to receive pressure energy from said convergent nozzle.

9. A pure fluid device for isolating steady flow and for clipping transient signals as recited in claim 8 further comprising a closed envelope surrounding the separation area between said convergent nozzle and said receiving aperture.

10. A pure fluid device for isolating steady flow and for clipping transient signals as recited in claim 9 wherein said closed envelope contains acoustical absorbing material.

(References on following page)

References Cited

UNITED STATES PATENTS

| | | | |
|---|---|---|---|
| 2,907,337 | 10/1959 | Bemporad | 137—83 |
| 3,068,880 | 12/1962 | Riordan | 137—81.5 XR |
| 3,071,157 | 1/1963 | Robertson et al. | 137—82 XR |
| 3,078,675 | 2/1963 | Baldwin | 137—81.5 XR |
| 3,148,962 | 9/1964 | Seaton | 137—81.5 |
| 3,219,048 | 11/1965 | Palmisano | 137—81.5 |
| 3,223,103 | 12/1965 | Trinkler | 137—81.5 XR |
| 3,261,372 | 7/1966 | Burton | 137—81.5 |
| 3,262,466 | 7/1966 | Adams et al. | 137—81.5 XR |
| 3,270,960 | 9/1966 | Phillips | 235—201 |
| 3,277,915 | 10/1966 | Dockery | 137—81.5 |

SAMUEL SCOTT, *Primary Examiner.*